(12) United States Patent
Liebman et al.

(10) Patent No.: US 11,798,438 B2
(45) Date of Patent: *Oct. 24, 2023

(54) HAPTIC ADHESIVE ARTICLE AND A METHOD OF FORMING THE SAME

(71) Applicant: Avery Dennison Corporation, Mentor, OH (US)

(72) Inventors: Dennis M. Liebman, Oak Harbor, OH (US); Dean T. Dupont, Oak Harbor, OH (US)

(73) Assignee: Avery Dennison Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,060

(22) Filed: May 19, 2022

(65) Prior Publication Data

US 2022/0284835 A1 Sep. 8, 2022

Related U.S. Application Data

(62) Division of application No. 17/029,558, filed on Sep. 23, 2020, now Pat. No. 11,386,813.

(60) Provisional application No. 62/905,286, filed on Sep. 24, 2019.

(51) Int. Cl.
  *G09F 3/10* (2006.01)
  *C09J 7/22* (2018.01)
  *C09J 7/38* (2018.01)

(52) U.S. Cl.
  CPC .......... *G09F 3/10* (2013.01); *C09J 7/22* (2018.01); *C09J 7/38* (2018.01); *Y10T 428/14* (2015.01); *Y10T 428/28* (2015.01)

(58) Field of Classification Search
  CPC ....... G09F 3/10; C09J 7/22; C09J 7/38; Y10T 428/28; Y10T 428/14
  See application file for complete search history.

(56) References Cited

U.S. PATENT DOCUMENTS

| | | | |
|---|---|---|---|
| 5,968,996 A * | 10/1999 | Sanchez | G09F 3/10 524/588 |
| 6,022,050 A | 2/2000 | Kline | |
| 6,357,941 B1 * | 3/2002 | Amano | G09F 3/10 60/761 |
| 6,890,400 B2 | 5/2005 | Scholz et al. | |
| 7,090,907 B2 | 8/2006 | Fearn et al. | |
| 7,101,825 B2 | 9/2006 | Francis et al. | |

(Continued)

FOREIGN PATENT DOCUMENTS

| | | | |
|---|---|---|---|
| CN | 105659309 A * | 6/2016 | ............. B44C 1/105 |
| EP | 0715511 | 6/1996 | |
| WO | 2007/034837 | 3/2007 | |

OTHER PUBLICATIONS

Machine Translation of CN 105659309 A. (Year: 2016).*

*Primary Examiner* — Patricia L. Nordmeyer

(57) ABSTRACT

An adhesive article includes a polymeric layer, a haptic layer disposed adjacent a first major surface of the polymeric layer, and an adhesive layer disposed adjacent a second major surface of the polymeric layer. The haptic layer includes a predetermined amount of at least one release agent. A method of forming the adhesive article includes providing the polymeric layer, disposing the haptic layer over and directly on the polymeric layer, and disposing the adhesive layer over and directly on the polymeric layer opposite the haptic layer.

19 Claims, 1 Drawing Sheet

(56) References Cited

U.S. PATENT DOCUMENTS

| | | | | |
|---|---|---|---|---|
| 2005/0255298 A1* | 11/2005 | Crum | ........................ | C09J 7/38 |
| | | | | 428/195.1 |
| 2015/0279246 A1* | 10/2015 | Bartholomew | ............ | C09J 7/22 |
| | | | | 283/81 |
| 2016/0326407 A1 | 11/2016 | Iwasaki et al. | | |

* cited by examiner

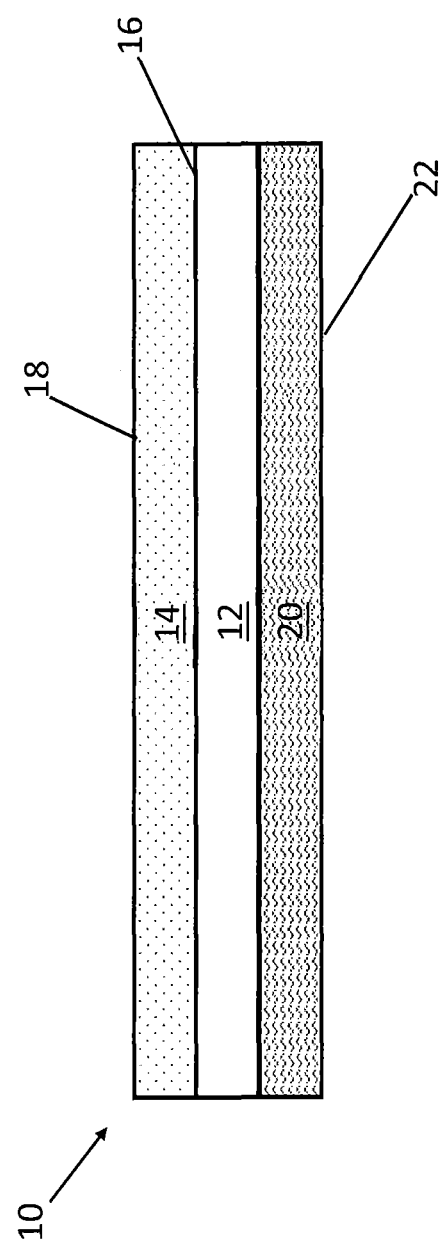

HAPTIC ADHESIVE ARTICLE AND A METHOD OF FORMING THE SAME

CROSS-REFERENCE TO RELATED APPLICATION

The present application is a division of U.S. patent application Ser. No. 17/029,558 filed Sep. 23, 2020, and claims the benefit to U.S. Provisional Patent Application Ser. No. 62/905,286, filed Sep. 24, 2019, both of which are incorporated herein by reference in their entireties.

FIELD

The present disclosure relates to adhesive articles, and more particularly, to an adhesive article including a haptic layer and a method of forming the adhesive article.

BACKGROUND

In certain applications, it may be desired to provide a label which has a tactile feel that enhances an aesthetic quality or appearance of the label. One way of providing the tactile feel to the label is to provide additional layers of ink to the label, such that printed indicia are perceptibly raised with respect to the surrounding areas. Inks are generally expensive compared to other components of the label. Accordingly, providing successive layers of ink to obtain the tactile feel increases a cost of the label, which is prohibitive.

Alternatively, a tactile tape can be utilized as an overlaminate to protect the label and other printed media. Such tapes that are utilized as overlaminates typically require a release liner. The release liner allows the tape to be provided in a roll and unwound when it is desired to apply the tape over the label. However, utilizing a release liner adds cost and complexity to the manufacture of the tape.

Thus, it would be advantageous and desirable to produce an adhesive article including a haptic layer that eliminates the need for a release liner, and a method of forming the adhesive article to minimize cost and complexity.

SUMMARY

In concordance and agreement with the present disclosure, an adhesive article including a haptic layer that eliminates the need for a release liner, and a method of forming the adhesive article to minimize cost and complexity, has surprisingly been discovered.

In one embodiment, a method of forming an adhesive article, comprises: providing a polymeric layer; disposing a haptic layer adjacent a first major surface of the polymeric layer, wherein the haptic layer includes a predetermined amount of at least one release agent; and disposing an adhesive layer adjacent a second major surface of the polymeric layer.

As aspects of certain embodiments, the haptic layer is disposed directly on the polymeric layer.

As aspects of certain embodiments, the adhesive layer is disposed directly on the haptic layer.

As aspects of certain embodiments, the method further comprises the step of curing the adhesive layer.

In another embodiment, an adhesive article, comprises: a polymeric layer; a haptic layer disposed adjacent a first major surface of the polymeric layer, wherein the haptic layer includes a predetermined amount of at least one release agent; and an adhesive layer disposed adjacent a second major surface of the polymeric layer.

As aspects of certain embodiments, the polymeric layer includes at least one polyolefin.

As aspects of certain embodiments, a thickness of the polymeric layer is in a range of about 5 microns to about 75 microns.

As aspects of certain embodiments, the haptic layer further includes at least one polymer material.

As aspects of certain embodiments, the haptic layer further includes at least one acrylic material.

As aspects of certain embodiments, the haptic layer further includes at least one gloss additive.

As aspects of certain embodiments, the haptic layer further includes at least one micro-particle.

As aspects of certain embodiments, a thickness of the haptic layer is in a range of about 1 micron to about 5 microns.

As aspects of certain embodiments, the predetermined amount of the at least one release agent is at least 0.05% by weight release agent.

As aspects of certain embodiments, the predetermined amount of the at least one release agent is no more than 65% by weight release agent.

As aspects of certain embodiments, the predetermined amount of the at least one release agent is in a range of about 10% to about 45% by weight release agent.

As aspects of certain embodiments, the release agent is at least one of a silicone and a wax.

As aspects of certain embodiments, a thickness of the adhesive layer is greater than a thickness of the haptic layer.

As aspects of certain embodiments, a thickness of the adhesive layer is about 50 microns or less.

As aspects of certain embodiments, the adhesive layer includes at least one of an acrylic material, a natural rubber material, a synthetic rubber material, a viscoelastic, and a pressure sensitive material.

As aspects of certain embodiments, the adhesive layer includes a cure mechanism.

BRIEF DESCRIPTION OF THE DRAWINGS

The above, as well as other advantages of the embodiments will become readily apparent to those skilled in the art from the following detailed description when considered in the light of the accompanying drawings in which:

FIG. 1 depicts a sectional view of an embodiment of an adhesive article including a haptic layer in accordance with the invention.

DETAILED DESCRIPTION

It is to be understood that the invention may assume various alternative orientations and step sequences, except where expressly specified to the contrary. It is also to be understood that the specific layers, films, methods and processes illustrated in the attached drawing, and described in the following specification are simply exemplary embodiments of the inventive concepts. Hence, specific dimensions, directions, or other physical characteristics relating to the embodiments disclosed are not to be considered as limiting, unless expressly stated otherwise.

Embodiments of a method of forming an adhesive article 10 and the adhesive article 10 formed by the method will be described below. The 10 embodiments of the adhesive article 10 may be utilized as an overlaminate. However, it should be appreciated that the adhesive article 10 may have other applications such as, for example, commercial, medical, industrial, retail, and other specialized applications.

FIG. 1 illustrates certain embodiments of the adhesive article 10. The adhesive article 10 may be a tape or tape-like article. However, it is understood that the adhesive article 10 may be any adhesive article as desired. The adhesive article 10 may be substantially transparent or substantially translucent. In other embodiments, the adhesive article 10 may be substantially opaque. Also, a thickness of the adhesive article 10 may vary between embodiments of the presently disclosed subject matter and may be any suitable thickness as desired. In some embodiments, the adhesive article 10 may exhibit an elongation of 10% to 80%. It should be appreciated, however, that the elongation of the adhesive article 10 may be any percentage as desired.

The adhesive article 10 may include a polymeric layer 12, a haptic or tactile layer 14, and an adhesive layer 20. The polymeric layer 12 provides a structural strength of the adhesive article 10 and supports the layers 14, 20 of the adhesive article 10. The polymeric layer 12 may be formed by extrusion, casting, or any other suitable forming process, as desired. A thickness of the polymeric layer 12 may vary between embodiments of the adhesive article 10 and may be any suitable thickness as desired. In certain embodiments, the thickness of the polymeric layer 12 is in a range of about 5 microns to about 75 microns. Preferably, the thickness of the polymeric layer 12 is in a range of about 9 microns to about 75 microns. More preferably, the thickness of the polymeric layer 12 is in a range of about 12 microns to about 45 microns.

In one embodiment, the polymeric layer 12 comprises a polyolefin. In these embodiments, the polyolefin may be polyethylene, polypropylene, polyester or another suitable polyolefin. Preferably, when the polymeric layer 12 comprises polypropylene, the polypropylene is bi-axially oriented or cast. In another embodiment, the polymeric layer 12 may be a blend of polyolefins. Further, although shown as a single layer in FIG. 1, the polymeric layer 12 may include two or more discrete layers. In one such embodiment, the polymeric layer 12 may comprise coextruded polyolefins. In this embodiment, the polymeric layer 12 may comprise a bi-axially oriented polypropylene portion with polyethylene disposed on at least one major surface of the polypropylene portion. In other embodiments, the polymeric layer 12 may comprise cellulose acetate or polylactide. In still other embodiments, the polymeric layer 12 may comprise another suitable polymeric material.

As illustrated in FIG. 1, the haptic layer 14 is disposed adjacent the polymeric layer 12. Preferably, the haptic layer 14 is disposed over and directly on a first major surface 16 of the polymeric layer 12. It should be appreciated that in the embodiments where the haptic layer 14 is disposed directly on the first major surface 16 of the polymeric layer 12 there are no intervening layers that separate the haptic layer 14 and the polymeric layer 12.

The haptic layer 14 is provided to enable the adhesive article 10 to exhibit an attribute that is tactile. In certain embodiments, the adhesive article 10 may exhibit a desired feel such as a soft touch, velvet, paper, sandy, or a leather property, for example. Preferably, the haptic layer 14 is an outermost layer of the adhesive article 10 and defines a first outer surface 18 thereof.

In some embodiments, a thickness of the haptic layer 14 is about 10 microns or less. Preferably, the thickness of the haptic layer 14 is less than about 7 microns. In one such embodiment, the thickness of the haptic layer 14 is in a range of about 1 micron to about 5 microns. It is understood that the thickness of the haptic layer 14 may vary between embodiments of the adhesive article 10 and may be any suitable thickness as desired.

The haptic layer 14 may be formed over the polymeric layer 12 by any suitable method. In some embodiments, the haptic layer 14 is formed by applying a coating to the polymeric layer 12. Preferably, the haptic layer 14 may be applied to polymeric layer 12 as a solution. The haptic layer 14 may also be applied to the polymeric layer 12 by way of a direct gravure, curtain coating, offset gravure, Meyer rod, or any other suitable coating method. Once applied, the haptic layer 14 may be formed by drying or curing the coating. Preferred curing techniques may include the use of heat, ultraviolet light, or an electron beam.

In certain embodiments, the haptic layer 14 may include a blend of at least one polymer material (e.g. polyurethane), at least one acrylic material, at least one gloss additive, and at least one release agent. In other embodiments, the haptic layer 14 further includes micro-particles. The micro-particles may be a variety of natural and synthetic materials such as ceramics, glass, polymers, and 10 metal, for example. Preferably, the blend of materials, the at least one gloss additive, the at least one release agent, and, in certain embodiments, the microparticles are cross-linked together to form the haptic layer 14.

In some embodiment to provide the release agent in the haptic layer 14, the release agent may be mixed with the materials and the additives and, in certain embodiments, the micro-particles of the haptic layer 14 before the haptic layer 14 is applied to the polymeric layer 12. Preferably, the release agent may be mixed with the materials and the additives and, in certain embodiments, the micro-particles of the haptic layer 14 at room temperature and at atmospheric pressure. In an embodiment, the release agent may be a silicone. In another embodiment, the release agent may be a wax. Preferred waxes include a polyethylene wax and a polypropylene wax.

In certain embodiments, the haptic layer 14 includes at least 0.05% by weight release agent. In other embodiments, the haptic layer 14 includes no more than 65% by weight release agent. Preferably, the haptic layer 14 may comprise between 10% and 45% by weight release agent.

Preferably, the haptic layer 14 may be disposed on the polymeric layer 12 before an adhesive layer 20 is disposed over and, preferably, directly on the polymeric layer 12. In this position, the adhesive layer 20 is separated from the haptic layer 14 by the polymeric layer 12. Also, it should be appreciated that when the adhesive layer 20 is disposed directly on the polymeric layer 12 there are no intervening layers that separate the adhesive layer 20 and the polymeric layer 12. Preferably, the adhesive layer 20 is an outermost layer of the adhesive article 10 and defines a second outer surface 22 thereof.

Preferably, the adhesive layer 20 is of a thickness that is greater than the thickness of the haptic layer 14. In some embodiments, the adhesive layer 20 is about 50 microns or less. In one such embodiment, the adhesive layer 20 may be about 12 microns. It is understood that the thickness of the adhesive layer 20 may vary between embodiments of the adhesive article 10 and may be any suitable thickness as desired.

The adhesive layer 20 includes an adhesive material. Preferably, the adhesive material selected for the adhesive layer 20 is of a pressure sensitive material. As utilized herein, the term "pressure sensitive adhesive" refers to a material that does not require heat or another energy input to provide a measurable adhesion at room temperature. In some embodiments, the pressure sensitive adhesive material may be a viscoelastic material which is in a rubbery state at room temperature with measurable adhesion, tack, and shear values. Suitable adhesive materials for use in the adhesive layer 20 include acrylics, natural rubbers, synthetic rubbers and other pressure sensitive adhesive materials. In embodiments where an acrylic adhesive is utilized, the adhesive may be water-based, solvent-based, or of the hot-melt variety. In some embodiments, the adhesive material may include an emulsion acrylic or is a mixture of an acrylic and a urethane. In embodiments where a rubber adhesive is utilized, the adhesive material may include styrene isoprene (SIS), styrene butadiene copolymer (SBR), or styrene butyl styrene (SBS).

Additionally, the adhesive layer 20 may include a cure mechanism. Preferably, the cure mechanism allows the adhesive layer 20 to be cured in a short period of time. In an embodiment, the adhesive layer 20 may include a thermal cure mechanism. In another embodiment, the adhesive layer 20 may include a light cure mechanism. In this embodiment, the adhesive material includes a light-absorbing material to initiate curing of the adhesive layer 20. Preferably, when the adhesive layer 20 includes a light cure mechanism, the adhesive material may be cured by exposure to UV light. In other embodiments, the cure mechanism may be one of an ambient moisture cure or a reactive system cure. In still other embodiments, the adhesive layer 20 may include a secondary cure mechanism.

After the adhesive article 10 is formed, the adhesive article 10 may be wound into a roll. Advantageously, the adhesive article 10 does not require a release liner to separate any of the layers 12, 14, 20. In some embodiments, the method may include matching the haptic layer 14 and the adhesive layer to allow the adhesive article 10 to be self-wound. Preferably, an attraction between the adhesive layer 20 and the haptic layer 14 is less than the attraction between the adhesion layer 20 and the polymeric layer 12 and the attraction between the haptic layer 14 and the polymeric layer 12. Thus, when the adhesive article 10 is formed into the roll, a portion of the haptic layer 14 is in direct contact with a portion of the adhesive layer 20. Upon unwinding, the haptic layer 14 and the adhesive layer 20 must cleanly separate.

The length of the adhesive article 10 provided in the roll may be predetermined. The roll of the adhesive article 10 may further comprise a spool or another member to support the adhesive article 10. Once the roll of the adhesive article 10 is unwound, the adhesive article 10 can be applied over a label or other printed media and then cut to a desired length and width.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention.

The invention claimed is:

1. An adhesive article, comprising:
 a polymeric layer;
 a haptic layer disposed adjacent a first major surface of the polymeric layer,
  wherein the haptic layer includes a predetermined amount of at least one release agent, at least one polymer material and optionally at least one acrylic material;
  wherein the release agent is a material selected from the group consisting of silicone or wax;
  wherein the at least one polymer material is at least one polyurethane;
  wherein the at least one release agent, the at least one polymer material, and when present, the at least one of the acrylic material, are cross-linked together; and
 an adhesive layer disposed adjacent a second major surface of the polymeric layer.

2. The adhesive article of claim 1, wherein the polymeric layer includes at least one polyolefin.

3. The adhesive article of claim 1, wherein a thickness of the polymeric layer is in a range of about 5 microns to about 75 microns.

4. The adhesive article of claim 1, wherein the at least one polymer material is more than one polymer material.

5. The adhesive article of claim 1, wherein the haptic layer further includes at least one micro-particle.

6. The adhesive article of claim 1, wherein a thickness of the haptic layer is in a range of about 1 micron to about 5 microns.

7. The adhesive article of claim 1, wherein the predetermined amount of the at least one release agent is at least 0.05% by weight release agent.

8. The adhesive article of claim 1, wherein the predetermined amount of the at least one release agent is no more than 65% by weight release agent.

9. The adhesive article of claim 1, wherein the predetermined amount of the at least one release agent is in a range of about 10% to about 45% by weight release agent.

10. The adhesive article of claim 1, wherein a thickness of the adhesive layer is greater than a thickness of the haptic layer.

11. The adhesive article of claim 1, wherein a thickness of the adhesive layer is about 50 microns or less.

12. The adhesive article of claim 1, wherein the adhesive layer includes at least one of an acrylic material, a natural rubber material, a synthetic rubber material, a viscoelastic, and a pressure sensitive material.

13. The adhesive article of claim 1, wherein the adhesive layer includes a cure mechanism.

14. An adhesive article, consisting of:
 a polymeric layer;
 a haptic layer disposed adjacent a first major surface of the polymeric layer,
  wherein the haptic layer includes a predetermined amount of at least one release agent, at least one polymer material, and at least one acrylic material;
  wherein the release agent is a material selected from the group consisting of silicone or wax;
  wherein the at least one polymer material is at least one polyurethane;
  wherein the at least one release agent, the at least one polymer material, and the at least one of the acrylic material, are cross-linked together; and
 an adhesive layer disposed adjacent a second major surface of the polymeric layer.

15. A method of forming an adhesive article, comprising:
 providing a polymeric layer;
 disposing a haptic layer adjacent a first major surface of the polymeric layer,
  wherein the haptic layer includes a predetermined amount of at least one release agent, at least one polymer material and optionally at least one acrylic material;
  wherein the release agent is selected from the group consisting of silicone or wax; wherein the at least one polymer material is at least one polyurethane; wherein the at least one release agent, the at least one polymer material, and when present, the at least one of the acrylic material, are cross-linked together; and disposing an adhesive layer adjacent a second major surface of the polymeric layer.

16. The method of claim 15, wherein the haptic layer is disposed directly on the polymeric layer.

17. The method of claim 15, wherein the adhesive layer is disposed directly on the haptic layer.

18. The method of claim 15, further comprising the step of curing the adhesive layer.

19. The method of claim 15, wherein the at least one polymer material is more than one polymer material.

* * * * *